(12) United States Patent
Niizuma

(10) Patent No.: US 9,866,032 B2
(45) Date of Patent: Jan. 9, 2018

(54) POWER SUPPLY SYSTEM FOR HOUSE

(71) Applicant: IHI Corporation, Tokyo (JP)

(72) Inventor: Motonao Niizuma, Tokyo (JP)

(73) Assignee: IHI CORPORATION (JP)

(*) Notice: Subject to any disclaimer, the term of this patent is extended or adjusted under 35 U.S.C. 154(b) by 594 days.

(21) Appl. No.: 14/484,724

(22) Filed: Sep. 12, 2014

(65) Prior Publication Data

US 2014/0379155 A1 Dec. 25, 2014

Related U.S. Application Data

(63) Continuation of application No. PCT/JP2013/060949, filed on Apr. 11, 2013.

(30) Foreign Application Priority Data

Apr. 11, 2012 (JP) ................................ 2012-090092

(51) Int. Cl.
*H02J 4/00* (2006.01)
*H02J 7/00* (2006.01)
(Continued)

(52) U.S. Cl.
CPC .............. *H02J 4/00* (2013.01); *B60L 3/0069* (2013.01); *B60L 11/182* (2013.01); *B60L 11/184* (2013.01); *B60L 11/1833* (2013.01); *B60L 11/1842* (2013.01); *B60L 11/1844* (2013.01); *B60L 11/1846* (2013.01); *B60L 11/1848* (2013.01); *B60L 11/1861* (2013.01);
(Continued)

(58) Field of Classification Search
CPC ... Y02T 10/7005; Y02T 90/14; Y02T 90/121; Y02T 90/128; Y02T 90/163
See application file for complete search history.

(56) References Cited

U.S. PATENT DOCUMENTS 6,104,160 A * 8/2000 Iwata .................... B60L 3/0092
307/66
8,084,883 B2 * 12/2011 Komazawa ............. B60L 11/14
307/9.1
(Continued)

FOREIGN PATENT DOCUMENTS

CN 102165669 A 8/2011
JP 63-181617 7/1988
(Continued)

OTHER PUBLICATIONS

Cvetkovic et al., Future home DC-based renewable energy nanoGrid system, Jul. 2010, 7 pages.*
(Continued)

*Primary Examiner* — Thuy Dao
(74) *Attorney, Agent, or Firm* — Ostrolenk Faber LLP

(57) ABSTRACT

A power supply system for a house is constructed such that electrical power that will need to be supplied from an electric vehicle to a house in a delay time taking a power transmission delay into account is predicted, a prediction data of the predicted electrical power is communicated to a power supply control device via a house communication device and a vehicle communication device, and electrical power that corresponds to the prediction data is supplied to a power-supplying coil by the power supply control device.

4 Claims, 3 Drawing Sheets

(51) Int. Cl.
*H02J 7/14* (2006.01)
*B60L 7/02* (2006.01)
*B60L 11/18* (2006.01)
*H02J 5/00* (2016.01)
*B60L 3/00* (2006.01)
*G05B 15/02* (2006.01)
*H02J 3/00* (2006.01)

(52) U.S. Cl.
CPC ............... *G05B 15/02* (2013.01); *H02J 3/00* (2013.01); *H02J 5/005* (2013.01); *B60L 2210/30* (2013.01); *B60L 2230/20* (2013.01); *B60L 2230/34* (2013.01); *H02J 2003/003* (2013.01); *H02J 2007/0096* (2013.01); *Y02E 60/721* (2013.01); *Y02T 10/705* (2013.01); *Y02T 10/7005* (2013.01); *Y02T 10/7044* (2013.01); *Y02T 10/7088* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 8,103,386 | B2* | 1/2012 | Ichikawa | B60L 11/1811 700/286 |
| 8,493,025 | B2* | 7/2013 | Turner | G06Q 30/02 180/65.29 |
| 8,706,336 | B2* | 4/2014 | Inui | B62H 1/02 180/218 |
| 8,725,338 | B2* | 5/2014 | Tanaka | B60K 6/48 180/65.1 |
| 8,866,438 | B2* | 10/2014 | Lee | H02J 3/1842 320/104 |
| 2008/0039980 | A1 | 2/2008 | Pollack | 700/295 |
| 2010/0164287 | A1* | 7/2010 | Komazawa | B60L 11/14 307/44 |
| 2011/0202192 | A1 | 8/2011 | Kempton | 700/291 |
| 2011/0231029 | A1 | 9/2011 | Ichikawa et al. | |
| 2012/0007563 | A1 | 1/2012 | Muto | 320/128 |
| 2012/0016546 | A1* | 1/2012 | Nilssen | H02J 9/062 701/22 |
| 2012/0203409 | A1* | 8/2012 | Sekijima | G01C 21/3469 701/22 |
| 2013/0248268 | A1* | 9/2013 | Matsuda | B60K 1/04 180/68.5 |

FOREIGN PATENT DOCUMENTS

| | | |
|---|---|---|
| JP | 01-174276 | 7/1989 |
| JP | 11-178234 | 7/1999 |
| JP | 2001-054176 | 2/2001 |
| JP | 2002-084660 | 3/2002 |
| JP | 2002-084673 | 3/2002 |
| JP | 2004-236422 | 8/2004 |
| JP | 2008-054439 | 3/2008 |
| JP | 2008-118806 | 5/2008 |
| JP | 2008-236916 | 10/2008 |
| JP | 2009-225551 | 10/2009 |
| JP | 2009-296880 | 12/2009 |
| JP | 2009-303483 | 12/2009 |
| JP | 2010-226891 | 10/2010 |

OTHER PUBLICATIONS

Monteiro et al., Impact of Electric Vehicles on power quality in a Smart Grid context, 2011, 6 pages.*
International Search Report and Written Opinion dated Jun. 18, 2013 in corresponding PCT International Application No. PCT/JP2013/060949.
European Search Report, dated Dec. 16, 2015, issued in corresponding European Patent Application No. 13775743.1. Total 9 pages.

* cited by examiner

POWER SUPPLY SYSTEM FOR HOUSE

This application is a continuation application based on a PCT Patent Application No. PCT/JP2013/060949, filed Apr. 11, 2013, whose priority is claimed on Japanese Patent Application No. 2012-090092, filed Apr. 11, 2012. The contents of both the PCT Application and the Japanese Application are incorporated herein by reference.

TECHNICAL FIELD

The present invention relates to a power supply system for a house that is able to supply electrical power from an electric vehicle to a house.

BACKGROUND ART

Electric vehicles (EV) and hybrid vehicles (HV), which are sometimes known as plug-in hybrid vehicles, are provided with, as a motive power source, rechargeable batteries (for example, secondary batteries such as lithium-ion batteries or nickel metal hydride batteries) that are large in capacity and are rechargeable. Hereinafter, a vehicle that is provided with this type of rechargeable batteries will be referred to simply as an 'electric vehicle'.

As electric vehicles have become increasingly popular, employing electric vehicles for uses other than as a means of transportation (for example, using them as a nighttime power supply, or as a source of emergency power) has been proposed (see, for example, Patent Documents 1 to 3). In conjunction with this, the method of predicting usage patterns of household electrical appliances, and controlling the operation of each electrical appliance based on the prediction results has been proposed (see, for example, Patent Document 4). In addition, technology related to the present invention is disclosed in Patent Documents 5 to 7.

CITATION LIST

Patent Documents

Patent Document 1: Japanese Unexamined Patent Application, First Publication No. H11-178234
Patent Document 2: Japanese Unexamined Patent Application, First Publication No. 2008-54439
Patent Document 3: Japanese Unexamined Patent Application, First Publication No. 2009-296880
Patent Document 4: Japanese Unexamined Patent Application, First Publication No. 2001-54176
Patent Document 5: Japanese Unexamined Patent Application, First Publication No. 2009-225551
Patent Document 6: Japanese Unexamined Patent Application, First Publication No. 2008-236916
Patent Document 7: Japanese Unexamined Patent Application, First Publication No. 2010-226891

SUMMARY OF INVENTION

Technical Problem

In order to supply electrical power from an electric vehicle to a house, it is necessary to electrically connect the electric vehicle and the house together via a power cable. In order to connect the electric vehicle to the house, it is necessary to manually engage the plugs of the power cable with the receptacles provided in the house or in the electric vehicle. There is a case of performing this manual operation outside the vehicle or outside the house whose environment might not be pleasant (for example, a cold environment, a hot environment or a dark environment).

The aforementioned plugs and receptacles are provided outside the vehicle or outside the house. Because of this, there is a possibility of rainwater or foreign objects (for example, insects) invading the plugs or the receptacles, and giving rise to electrical connection faults such as connection failures, short-circuiting, and the like.

Moreover, in a conventional system, in some cases, there is a time delay in the transfer of electrical power from the electric vehicle to the house. In such cases, there is a possibility that the electrical power required in the house does not match the electrical power supplied from the electric vehicle, and excesses or deficiency of power supply occurs. One way of preventing occurrence of such excesses or deficiencies is to provide rechargeable batteries in the house. In this case, however, a problem arises that extra task of installing and maintaining the rechargeable batteries is required.

The present invention is conceived in order to solve the above-described problems. Namely, it is an object of the present invention to provide a power supply system for a house that is able to supply the required electrical power from an electric vehicle to a house, that makes it possible to essentially avoid electrical connection faults which accompany the connecting and disconnecting of a power cable by rendering the task of connecting such a power cable unnecessary, that is able to greatly reduce any power supply delay, and that enables the rechargeable battery capacity needed in the house to be greatly reduced.

Solution to Problem

According to an aspect of the present invention, in a power supply system for a house that supplies electrical power from an electric vehicle to the house, the electric vehicle includes: a rechargeable battery; a power-supplying coil; a power-supplying circuit that, using the rechargeable battery as a power source, drives the power-supplying coil in a voltage-current waveform that is suitable for supplying electrical power wirelessly; a vehicle communication device; and a power supply control device that controls the power-supplying circuit. The house includes: a power-receiving coil; a power-receiving circuit that receives electrical power from the power-receiving coil into the house; a house communication device that is configured to communicate with the vehicle communication device; and a power prediction device that predicts electrical power required in the house. The power-supplying coil and the power-receiving coil are constructed such that they form an electromagnetic coupling circuit when they are placed a preset distance apart from each other. The power prediction device is constructed such that it predicts electrical power that will need to be supplied from the electric vehicle to the house in a delay time taking a power transmission delay into account, and communicates a prediction data of the predicted electrical power to the power supply control device via the house communication device and the vehicle communication device. Furthermore, the power supply control device is constructed such that it supplies electrical power that corresponds to the power prediction data to the power-supplying coil.

Advantageous Effects of Invention

According to the above-described aspect of the present invention, the power-supplying coil and the power-receiving coil are located a preset distance apart from each other and form an electromagnetic coupling circuit. As a result of this, it is possible to supply the required electrical power from the electric vehicle to the house by supplying electrical power wirelessly between the power-supplying coil and the power-receiving coil, and to thereby render the task of connecting a power cable unnecessary. Accordingly, it is possible to essentially avoid the occurrence of electrical connection faults that accompany the connecting and disconnecting of a power cable. Moreover, the electrical power that will need to be supplied from the electric vehicle to the house in the delay time taking into account power transmission delay is predicted by the power prediction device, this power prediction data is communicated to the power supply control device via the house communication device and the vehicle communication device, and the power supply control device supplies electrical power corresponding to the prediction data to the power-supplying coil. Accordingly, it is possible to greatly reduce the time delay between the electrical power required by the house and the electrical power supplied from the power-supplying coil, and to thereby enable the rechargeable battery capacity needed in the house to be greatly reduced.

DESCRIPTION OF EMBODIMENTS

Hereinafter, preferred embodiments of the present invention will be described in detail based on the attached drawings. Note that the same descriptive symbols are used for portions that are the same in each drawing and duplicated descriptions thereof are omitted.

First Embodiment

Figure 1:
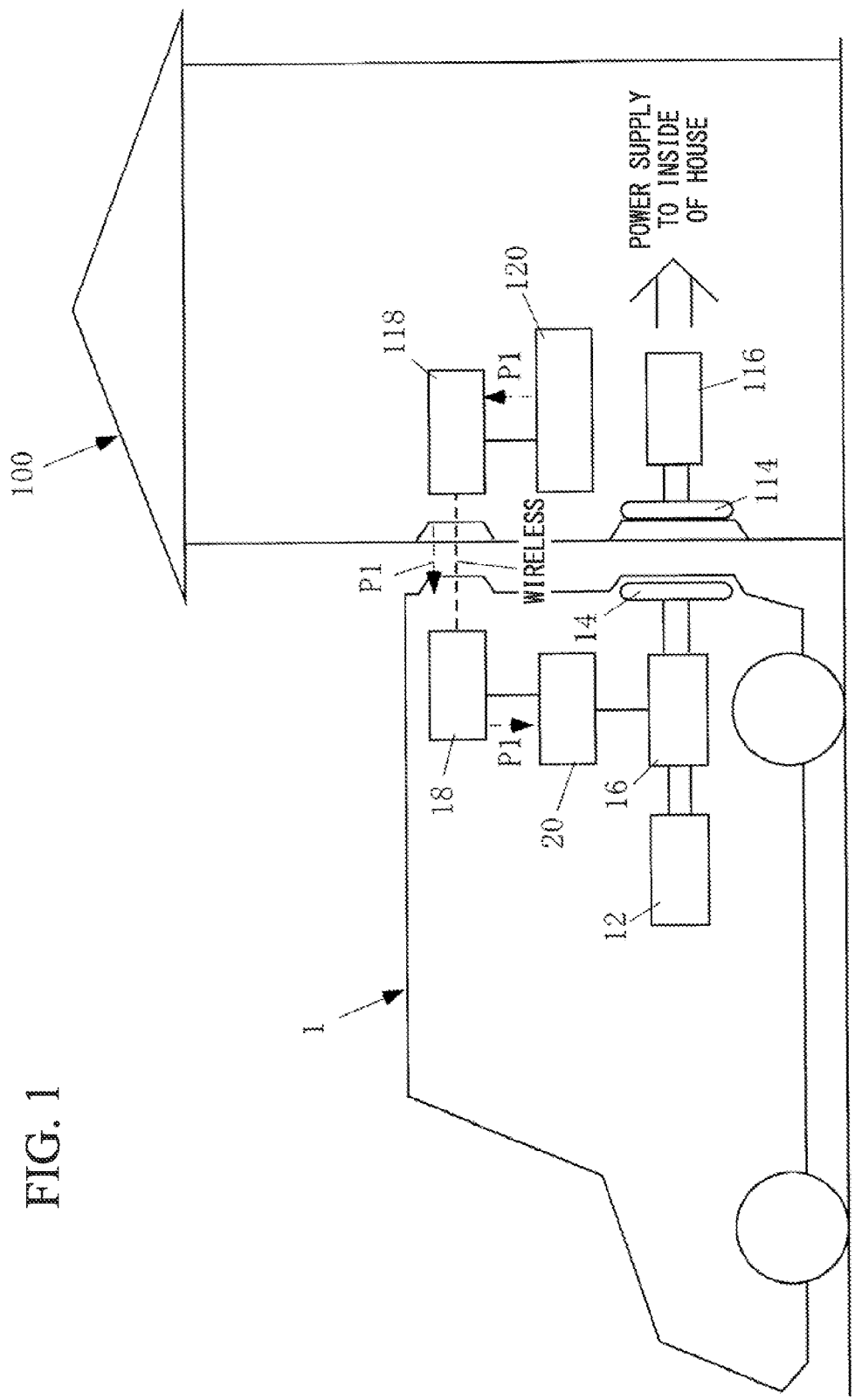
FIG. 1 is a block diagram showing a first embodiment of the present invention.

FIG. 1 is a block diagram showing a first embodiment of the present invention. A power supply system for a house that supplies electrical power from an electric vehicle 1 to a house 100 is shown in FIG. 1.

The electric vehicle 1 is provided with a rechargeable battery 12, a power-supplying coil 14, a power-supplying circuit 16 that, using the rechargeable battery 12 as a power source, drives the power-supplying coil 14 in a voltage-current waveform that is suitable for supplying electrical power wirelessly, a vehicle communication device 18, and a power supply control device 20 that controls the power-supplying circuit 16.

The house 100 is provided with a power-receiving coil 114, a power-receiving circuit 116 that receives electrical power from the power-receiving coil 114 into the house 100, a house communication device 118 that is able to communicate with the vehicle communication device 18, and a power prediction device 120 that predicts the electrical power required in the house 100.

The power-supplying coil 14 and the power-receiving coil 114 are constructed such that they form an electromagnetic coupling circuit when they are placed a preset distance apart from each other. This preset distance is not limited to a single value, and may be a range of value, for example, between 10 cm and 30 cm.

The power supply control device 20 controls the power-supplying circuit 16 to supply electrical power that corresponds to power prediction data P1 to the power-supplying coil 14.

With the above-described structure, the power prediction device 120 predicts electrical power that will need to be supplied from the electric vehicle 1 to the house 100 in a delay time T taking power transmission delays into account. The power prediction device 120 communicates the predicted power prediction data P1 to the power supply control device 20 via the house communication device 118 and the vehicle communication device 18. In addition, the power supply control device 20 supplies electrical power that corresponds to the prediction data P1 to the power-supplying coil 14.

As is shown in FIG. 1, in an adjacent state in which the electric vehicle 1 is adjacent to the house 100, the electrical vehicle 1 is able to supply electrical power to the inside of the house 100. The term "adjacent state" refers to a state in which the power-supplying coil 14 and the power-receiving coil 114 are placed a preset distance apart from each other, that is, a distance in which it is possible for electrical power to be supplied wirelessly from the power-supplying coil 14 to the power-receiving coil 114.

The rechargeable battery 12 is a rechargeable battery (for example, a secondary battery such as a lithium-ion battery or a nickel metal hydride battery) that is mounted in the electric vehicle 1. The rechargeable battery 12 supplies electrical power that is used to drive a motor (not shown) that causes the electric vehicle to move.

In this example, the power-supplying coil 14 is a coil that is provided in a rear portion of the electric vehicle 1, and that is used to supply electrical power wirelessly from the rechargeable battery 12 to the house 100. An electromagnetic coupling circuit between the power-supplying coil 14 and the power-receiving coil 114 is formed by placing the power-supplying coil 14 adjacent to the power-receiving coil 114 that is provided in the house 100. This electromagnetic coupling circuit refers to a circuit in which the power-supplying coil 14 and the power-receiving coil 114 are electromagnetically coupled together so that electrical power can be supplied wirelessly from the power-supplying coil 14 to the power-receiving coil 114. The above-described electromagnetic coupling circuit may be either a circuit that supplies electrical power by means of electromagnetic induction, or a circuit that supplies electrical power by means of magnetic field resonance.

The power-supplying coil 14 is provided in the rear portion of the electric vehicle 1 such that it is completely covered by a weatherproof cover. This weatherproof cover is provided in order to prevent the ingress of rainwater or foreign objects (for example, insects) and the like into the power-supplying coil 14. The weatherproof cover is formed from a material (for example, plastic or FRP (fiber reinforced plastic)) that does not obstruct the wireless supply of electrical power.

The power-supplying circuit 16 supplies electrical power wirelessly from the rechargeable battery 12 to the house 100 via the electromagnetic coupling circuit that is formed by the power-supplying coil 14 and the power-receiving coil 114. More specifically, the power-supplying circuit 16 converts electrical power (i.e., DC power) that is supplied from the rechargeable battery 12 into AC power that has a waveform suitable for a wireless power supply, and supplies the AC power to the power-supplying coil 14. As a result of this, the wireless supply of electrical power from the electric vehicle 1 to the house 100 is achieved. The power-supplying circuit 16 is realized by a circuit in which switching legs (i.e., circuits that are formed by two transistors connected together in series, and a diode that is connected in parallel to each of these two transistors) are connected in parallel. The power-supplying circuit 16 controls the electrical power that is to be supplied wirelessly by implementing duty control of the switching legs while electrical power is being supplied. 'Duty control' refers to control that is performed in order to change the ratio of the length of time for which either the upper or lower transistor of the switching leg is conducting (i.e., is in a conducting state) relative to the length of time that both the upper and lower transistors of the switching leg are not conducting (i.e., is in a non-conductive state). Note that 'duty D' refers to the ratio of the length of time of the conducting state relative to the total time, namely, to a value that is expressed by the formula: "length of time of the conducting state/(length of time of the conducting state+length of time of the non-conducting state)".

The power-receiving circuit 116 converts the AC power, which is received via the electromagnetic coupling circuit formed by the power-supplying coil 14 and the power-receiving coil 114 and which has a waveform suitable for the wireless power supply, into electrical power having a waveform suitable for normal use. The power-receiving circuit 116 is realized by a circuit in which rectifying elements such as diodes are bridge-connected. Examples of the structure of the power-supplying circuit 16 and the power-receiving circuit 116 are disclosed in Patent Documents 5 and 6.

The power prediction device 120 predicts the electrical power that will be required by the house 100. The prediction method is disclosed, for example, in Patent Documents 2 and 4.

The above-described 'delay time' is a time T lasting from the point when power prediction data P1 is output by the power prediction device 120 until electrical power that corresponds to the power prediction data P1 is supplied to the house 100.

In the first embodiment, if the delay time T is constant (for example, 2 to 3 seconds), the delay time T is determined in advance either by actual measurement or by calculation, and is stored in the power prediction device 120. The power prediction device 120 predicts "power prediction data P1 temporally in advance by the length of the delay time T", and outputs it as a command value. This "power prediction data P1 that is temporally in advance by the length of the delay time T" refers to prediction data P1 after the delay time T. For example, if the delay time T is three seconds and the current time is 1:10 and 30 seconds, the power prediction device 120 does not predict power prediction data for the current time (namely, for 1:10 and 30 seconds), but predicts power prediction data for a time that is in advance of the current time by the delay time (namely, for 1:10 and 33 seconds). The communication of this power prediction data P1 from the power prediction device 120 to the power supply control device 20 is preferably performed repeatedly during the period when electrical power is being supplied. For example, if the electrical power required by the house 100 changes periodically at one minute intervals, the power prediction data P1 may be repeatedly predicted at one minute intervals, and the communication will be repeatedly performed during the period when electrical power is being supplied.

By employing the structure of the above-described first embodiment, when the delay time T is constant, the electrical power that will need to be supplied from the electric vehicle 1 to the house 100 in the delay time T taking the power transmission delay into account is predicted by the power prediction device 120. The power prediction data P1 is communicated to the power supply control device 20 via the house communication device 118 and the vehicle communication device 18. Moreover, the power supply control device 20 supplies electrical power that corresponds to the prediction data P1 to the power-supplying coil 14. Accordingly, it is possible to greatly reduce the time delay between the electrical power that is required by the house 100 and the electrical power that is supplied from the power-supplying coil 14, and it is thereby possible to greatly reduce the rechargeable battery capacity needed in the house.

Second Embodiment

Figure 2:
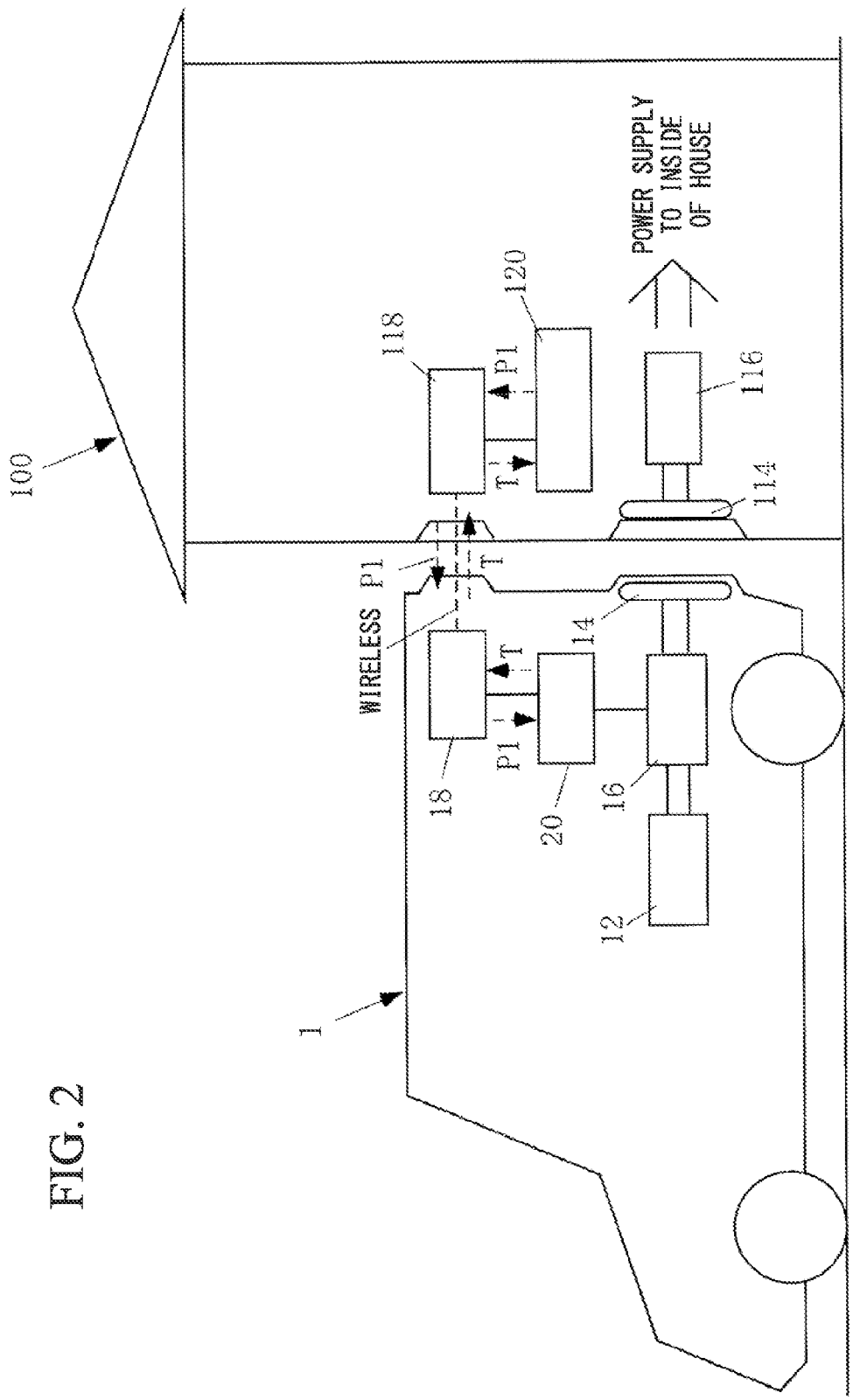
FIG. 2 is a block diagram showing a second embodiment of the present invention.

FIG. 2 is a block diagram showing a second embodiment of the present invention. In the present embodiment, the power supply control device 20 of each electric vehicle 1 stores the delay time T that has been determined in advance by actual measurement or by calculation. In addition, the vehicle communication device 18 of the electric vehicle 1 is constructed such that it is able to communicate the stored delay time T to the house communication device 118. The remaining structure is the same as in the first embodiment.

By employing the above-described structure, it is possible to communicate the delay time T stored in the power supply control device 20 from the vehicle communication device 18 to the house communication device 118 prior to the electric vehicle 1 stopping and beginning to supply electrical power. This communication may be performed once prior to the starting of the power supply, or may be performed a plurality of times. The communication of the power prediction data P1 from the power prediction device 120 to the power supply control device 20 is preferably performed repeatedly during the period when electrical power is being supplied.

According to the structure of the second embodiment, even if the delay time T is different in each electric vehicle 1, the electrical power that will need to be supplied from the electric vehicle 1 to the house 100 in the delay time T taking the power transmission delay into account is predicted by the power prediction device 120. The power prediction data P1 is communicated to the power supply control device 20 via the house communication device 118 and the vehicle communication device 18. Moreover, the power supply control device 20 supplies electrical power that corresponds to the prediction data P1 to the power-supplying coil 14. Accordingly, it is possible to greatly reduce the time delay between the electrical power that is required by the house 100 and the electrical power that is supplied from the power-supplying coil 14, and it is thereby possible to greatly reduce the rechargeable battery capacity needed in the house.

Third Embodiment

Figure 3:
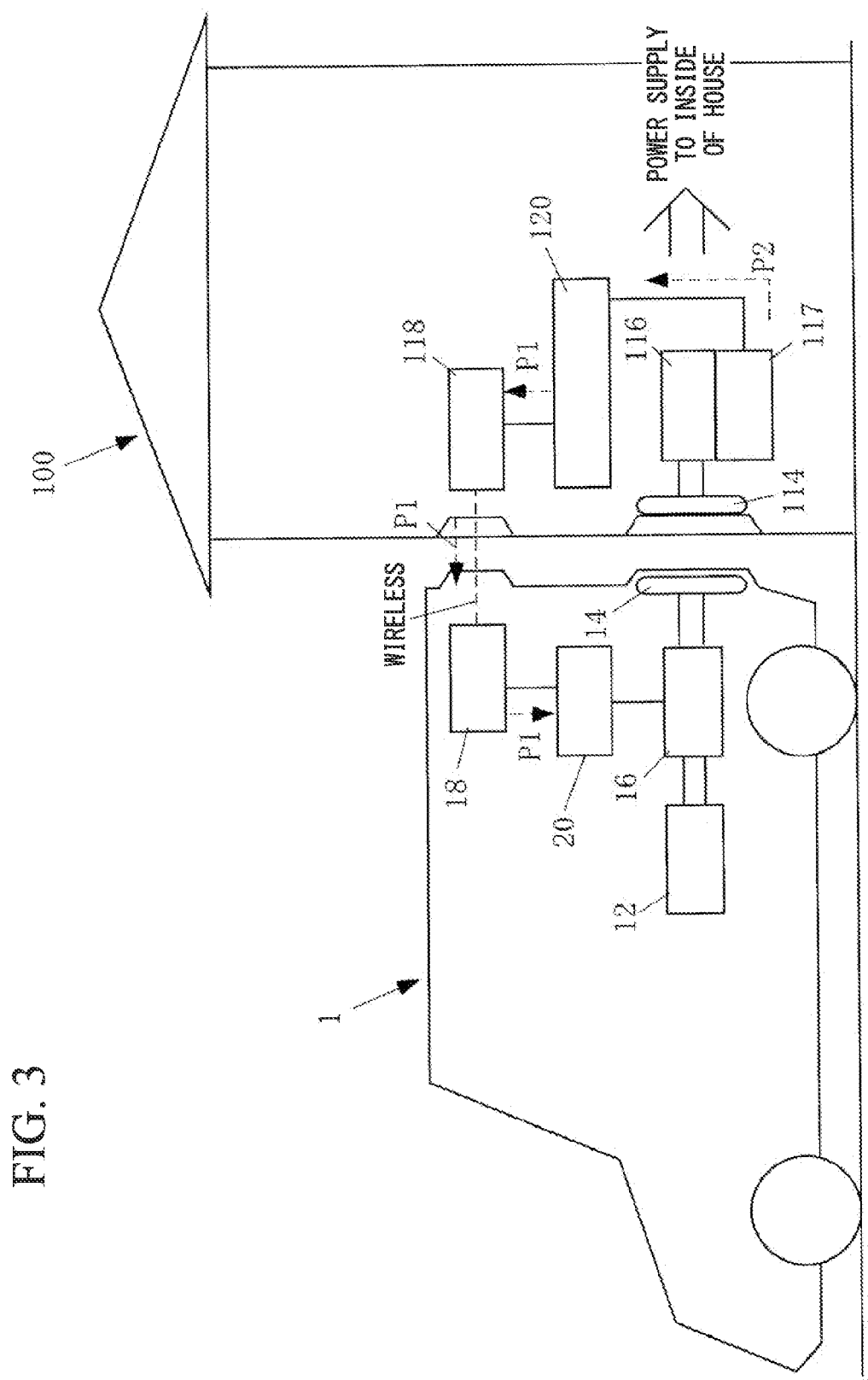
FIG. 3 is a block diagram showing a third embodiment of the present invention.

FIG. 3 is a block diagram showing a third embodiment of the present invention. In the present embodiment, the power-receiving circuit 116 has a received power measuring device 117 that measures received electrical power P2. The power prediction device 120 is constructed such that it measures the delay time T from the received electrical power P2 that is measured by the received power measuring device 117. The remaining structure is the same as in the first embodiment. Note that the specific circuit structure of the power measuring device is disclosed, for example, in Patent Document 7.

According to the above-described third embodiment of the present invention, the received power measuring device 117 measures the continuously-changing received electrical power P2, and transmits the measurement results to the power prediction device 120. Accordingly, the delay time T can be actually measured by the power prediction device 120. Moreover, when there is a change (i.e., an increase or a decrease) in the power prediction data P1, by using the time lag until the received electrical power P2 increases or decreases as the delay time T, the delay time T can always be accurately measured.

According to the above-described embodiments, the power-supplying coil 14 and the power-receiving coil 114 form an electromagnetic coupling circuit when they are placed a preset distance apart from each other. Because of this, it is possible for the required electrical power to be supplied from the electric vehicle 1 to the house 100 via the wireless supply of electrical power between the power-supplying coil 14 and the power-receiving coil 114, and the task of connecting a power cable is rendered unnecessary. Accordingly, it is possible to essentially avoid any occurrence of electrical connection faults that accompany the connecting and disconnecting of a power cable. Moreover, the electrical power that will need to be supplied from the electric vehicle 1 to the house 100 in the delay time T taking into account the power transmission delay is predicted by the power prediction device 120, the power prediction data P1 is communicated to the power supply control device 20 via the house communication device 118 and the vehicle communication device 18, and the power supply control device 20 supplies electrical power corresponding to the prediction data P1 to the power-supplying coil 14. Accordingly, it is possible to greatly reduce the time delay between the electrical power required by the house 100 and the electrical power supplied from the power-supplying coil 14, and to thereby enable the rechargeable battery capacity needed in the house 100 to be greatly reduced.

Note that the present invention is not limited to the above-described embodiments, and that various modifications and alterations can be made without departing from the scope of the appended claims and their equivalents. The present invention is not limited by the foregoing description and is only limited by the scope of the appended claims. Provided that the electromagnetic coupling circuit is able to achieve the wireless supply of electrical power from a power-supplying coil to a power-receiving coil, it may be either an electromagnetic induction type or a magnetic field resonance type of circuit.

INDUSTRIAL APPLICABILITY

The power supply system for a house according to the present invention makes it possible to supply the required electrical power from an electric vehicle to a house, makes it possible to essentially avoid electrical connection faults that accompany the connecting and disconnecting of a power cable, and makes it possible to greatly reduce any power supply delay, and to also greatly reduce the rechargeable battery capacity needed in the house.

REFERENCE SIGNS LIST

1 . . . Electric vehicle
12 . . . Rechargeable battery
14 . . . Power-supplying coil
16 . . . Power-supplying circuit
18 . . . Vehicle communication device
20 . . . Power supply control device
100 . . . House
114 . . . Power-receiving coil
116 . . . Power-receiving circuit
117 . . . Received power measuring device
118 . . . House communication device
120 . . . Power prediction device
P1 . . . Prediction data
P2 . . . Received electrical power
T . . . Delay time

The invention claimed is:
1. A power supply system for a house that supplies electrical power from an electric vehicle to the house, wherein
the electric vehicle comprises:
a rechargeable battery;
a power-supplying coil;
a power-supplying circuit that, using the rechargeable battery as a power source, drives the power-supplying coil in a voltage-current waveform that is suitable for supplying electrical power wirelessly;
a vehicle communication device; and
a power supply control device that controls the power-supplying circuit; and wherein
the house comprises:
a power-receiving coil;
a power-receiving circuit that receives electrical power from the power-receiving coil into the house;
a house communication device that is configured to communicate with the vehicle communication device; and
a power prediction device that predicts electrical power required in the house,
the power-supplying coil and the power-receiving coil are constructed such that they form an electromagnetic coupling circuit when they are placed a preset distance apart from each other,
the power prediction device is constructed such that it predicts electrical power that will need to be supplied from the electric vehicle to the house in a delay time taking a power transmission delay into account, and communicates a prediction data of the predicted electrical power to the power supply control device via the house communication device and the vehicle communication device, and
the power supply control device is constructed such that it supplies electrical power that corresponds to the power prediction data to the power-supplying coil,
wherein the delay time is a time from when the prediction data is output by the power prediction device to when electrical power that corresponds to the prediction data is supplied to the house,
wherein the power supply control device of the electric vehicle stores delay time that has been determined in advance by at least one of actual measurement and calculation, and
the vehicle communication device is constructed such that it communicates the stored delay time to the house communication device.
2. The power supply system for a house according to claim 1, wherein the power-receiving circuit comprises a received power measuring device that measures received electrical power, and the power prediction device is constructed such that it measures an actual delay time.

3. A house to which electrical power is supplied from an electric vehicle, the house comprising:
   a power-receiving coil;
   a power-receiving circuit that receives electrical power from the power-receiving coil into the house;
   a house communication device that receives, from the electric vehicle, a delay time taking a power transmission delay into account; and
   a power prediction device that is constructed such that it predicts electrical power that will need to be supplied from the electric vehicle to the house in the delay time, and
      communicates a prediction data of the predicted electrical power to the electrical vehicle via the house communication device,
   wherein the delay time is a time from when the prediction data is output by the power prediction device to when electrical power that corresponds to the prediction data is supplied to the house,
   wherein the delay time is a time from when the prediction data is output by the power prediction device to when electrical power that corresponds to the prediction data is supplied to the house,
   wherein the power supply control device of the electric vehicle stores delay time that has been determined in advance by at least one of actual measurement and calculation, and
   the vehicle communication device is constructed such that it communicates the stored delay time to the house communication device.

4. An electric vehicle which supplies electrical power to a house, the electric vehicle comprising:
   a rechargeable battery;
   a power-supplying coil;
   a power-supplying circuit that, using the rechargeable battery as a power source, drives the power-supplying coil in a voltage-current waveform that is suitable for supplying electrical power wirelessly;
   a vehicle communication device; and
   a power supply control device that controls the power-supplying circuit,
   wherein the power supply control device stores a delay time that has been determined in advance by at least one of actual measurement and calculation, the delay time taking a power transmission delay into account,
   the vehicle communication device is constructed such that it communicates the stored delay time to the house,
   the vehicle communication device receives a prediction data of predicted electrical power which will need to be supplied from the electric vehicle to the house in the delay time, and
   the power supply control device is constructed such that it supplies electrical power that corresponds to the prediction data to the power-supplying coil, and
   wherein the delay time is a time from when the prediction data is output by a power prediction device, which predicts electrical power required in the house, of the house to when electrical power that corresponds to the prediction data is supplied to the house,
   wherein the delay time is a time from when the prediction data is output by the power prediction device to when electrical power that corresponds to the prediction data is supplied to the house,
   wherein the power supply control device of the electric vehicle stores delay time that has been determined in advance by at least one of actual measurement and calculation, and
   the vehicle communication device is constructed such that it communicates the stored delay time to the house communication device.

* * * * *